(12) United States Patent
Noda et al.

(10) Patent No.: US 7,715,668 B2
(45) Date of Patent: May 11, 2010

(54) POLARIZATION-INDEPENDENT TWO-DIMENSIONAL PHOTONIC CRYSTAL MULTIPLEXER/DEMULTIPLEXER

(75) Inventors: Susumu Noda, Uji (JP); Takashi Asano, Kyoto (JP); Yoshinori Tanaka, Kyoto (JP)

(73) Assignee: Kyoto University, Kyoto-Shi (JP)

( * ) Notice: Subject to any disclaimer, the term of this patent is extended or adjusted under 35 U.S.C. 154(b) by 0 days.

(21) Appl. No.: 12/438,491

(22) PCT Filed: Aug. 27, 2007

(86) PCT No.: PCT/JP2007/000918

§ 371 (c)(1),
(2), (4) Date: Feb. 23, 2009

(87) PCT Pub. No.: WO2008/026315

PCT Pub. Date: Mar. 6, 2008

(65) Prior Publication Data

US 2009/0162008 A1 Jun. 25, 2009

(30) Foreign Application Priority Data

Aug. 28, 2006 (JP) .............................. 2006-230509

(51) Int. Cl.
*G02B 6/00* (2006.01)
*G02B 6/02* (2006.01)
(52) U.S. Cl. ............................. 385/14; 385/11; 385/123
(58) Field of Classification Search ........................ None
See application file for complete search history.

(56) References Cited

U.S. PATENT DOCUMENTS 6,785,454 B2 * 8/2004 Abe ........................... 385/123

(Continued)

FOREIGN PATENT DOCUMENTS

CA 2 341 815 A1 9/2001

(Continued)

OTHER PUBLICATIONS

Tanaka et al., "Henpa Henkanki o Motsu 2 Jigen Photonic Kessho Hacho Gobunpa Device," 2006 Nen (Heisei 18 Nen) Shunki Dai 53 Kai Oyo Butsurigaku Kankei Rengo Koenkai Koen Yokoshu, vol. 3, Mar. 22, 2006, p. 1121.

(Continued)

*Primary Examiner*—Tina M Wong
(74) *Attorney, Agent, or Firm*—Oliff & Berridge, PLC

(57) ABSTRACT

The present invention is aimed at providing a two-dimensional photonic crystal wavelength multiplexer/demultiplexer capable of multiplexing and demultiplexing both TE and TM-polarized lights. In the wavelength multiplexer/demultiplexer, first and second resonators having the same resonance wavelength $\lambda r$ are provided between first and second waveguides and which are separately provided in a two-dimensional photonic crystal having a photonic band gap for the TE polarization. A first polarization converter for converting a TM-polarized light to a TE-polarized light is provided on the first waveguide 121 between the first and second resonators and. Similarly, a second polarization converter for converting a TE-polarized light to a TM-polarized light is provided on the second waveguide between the first and second resonators and. Among the light propagating through the first waveguide, the TE-polarized light with wavelength $\lambda r$ is introduced from the first resonator into the second waveguide, whereas the TM-polarized light is converted to a TE-polarized light by the first polarization converter and then introduced through the second resonator into the second waveguide.

20 Claims, 7 Drawing Sheets

U.S. PATENT DOCUMENTS

| | | | |
|---|---|---|---|
| 7,123,804 B2 * | 10/2006 | Baba et al. | 385/129 |
| 7,298,945 B2 * | 11/2007 | Gunn et al. | 385/37 |
| 7,346,239 B2 * | 3/2008 | Romagnoli et al. | 385/39 |
| 2002/0009277 A1 | 1/2002 | Noda et al. | |
| 2006/0051014 A1 | 3/2006 | Noda et al. | |

FOREIGN PATENT DOCUMENTS

| | | |
|---|---|---|
| CN | 1732395 A | 2/2006 |
| EP | 1 136 853 A1 | 9/2001 |
| EP | 1 569 017 A1 | 8/2005 |
| JP | A-2001-272555 | 10/2001 |
| JP | A-2004-233941 | 8/2004 |
| KR | 10-2005-0085404 | 8/2005 |
| WO | WO 2004/053549 A1 | 6/2004 |
| WO | WO 2006/100905 A1 | 9/2006 |

OTHER PUBLICATIONS

Tanaka et al., "2 Jigen Photonic Kessho Slab Henpa Henkanki no Sakusei," 2005 Nen (Heisei 17 Nen) Shuki Dai 66 Kai Oyo Butsurigaku Kankei Rengo Koenkai Koen Yokoshu, vol. 3, Sep. 7, 2005, p. 912.

Takayama et al., "2 Jigen Photonic Kessho Slab Henpa Mode Henkanki no Teian," 2005 Nen (Heisei 17 Nen), Shunki Dai 52 Kai Oyo Butsurigaku Kankei Rengo Koenkai Koen Yokoshu, vol. 3, Mar. 29, 2005, p. 1194.

Tanaka et al., "Henpa Muizon 2 Jigen Photonic Kessho Hacho Gobunpa Device no Teian," 2006 Nen (Heisei 18 Nen) Shuki Dai 67 Kai Oyo Butsurigaku Kankei Rengo Koenkai Koen Yokoshu, vol. 3, Aug. 29, 2006, p. 962.

* cited by examiner

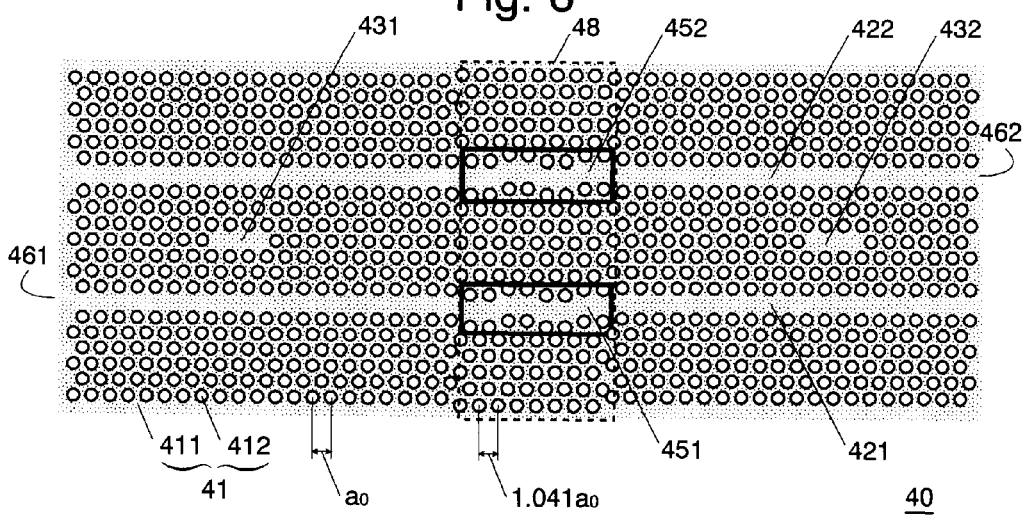
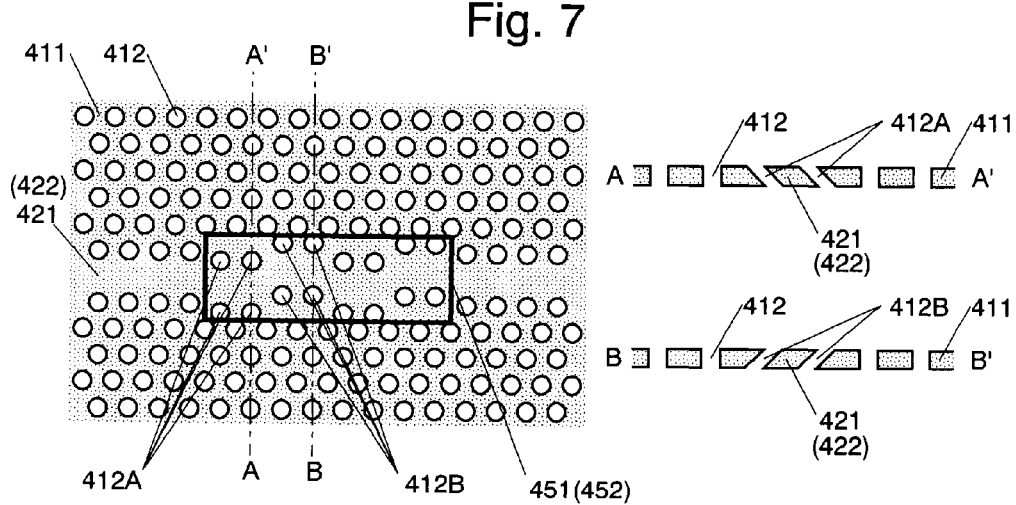

Fig. 8
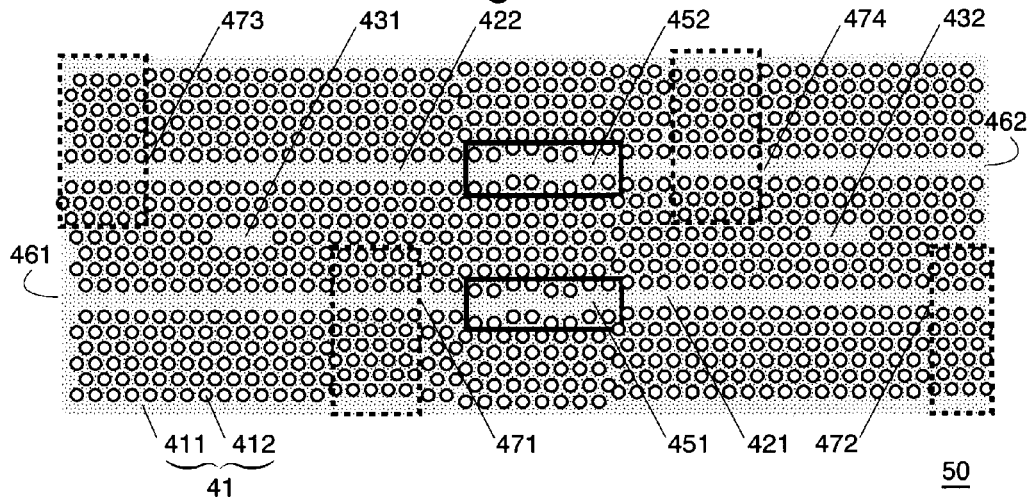
Fig. 9
<INTRODUCING TE-POLARIZED LIGHT INTO FIRST WAVEGUIDE 421>
(a) TE-POLARIZED LIGHT
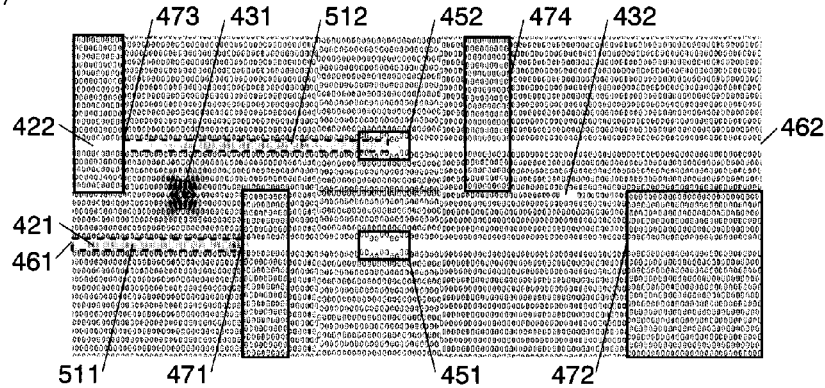
(b) TM-POLARIZED LIGHT
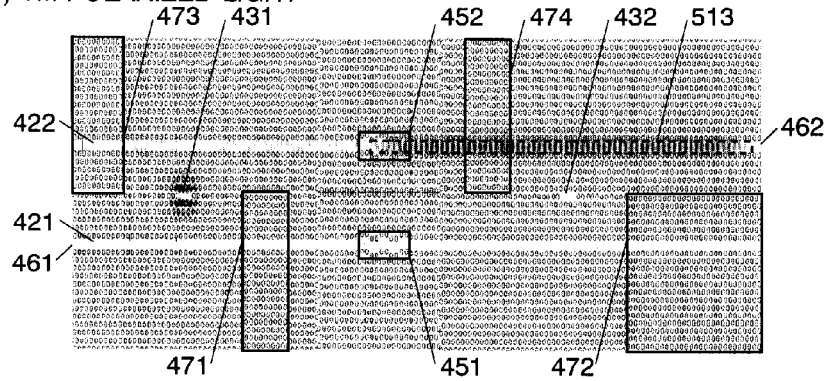

Fig. 10
<INTRODUCING TM-POLARIZED LIGHT INTO FIRST WAVEGUIDE 421>
(a) TE-POLARIZED LIGHT
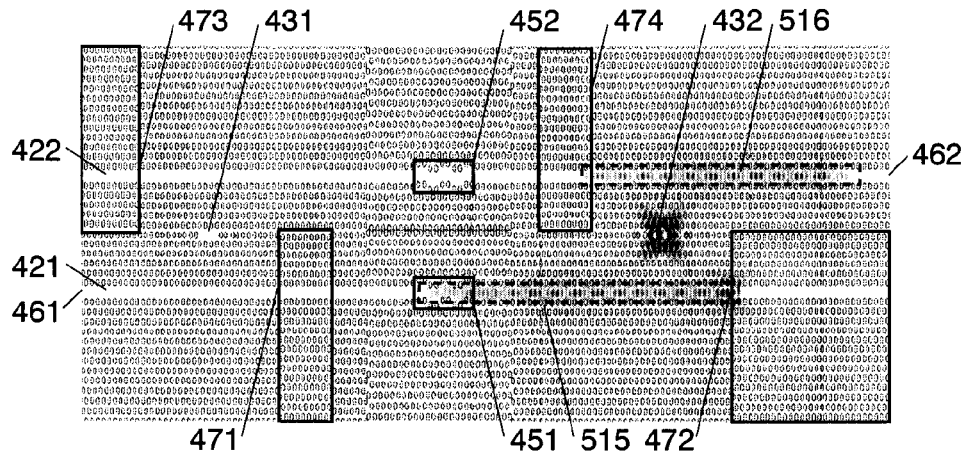
(b) TM-POLARIZED LIGHT
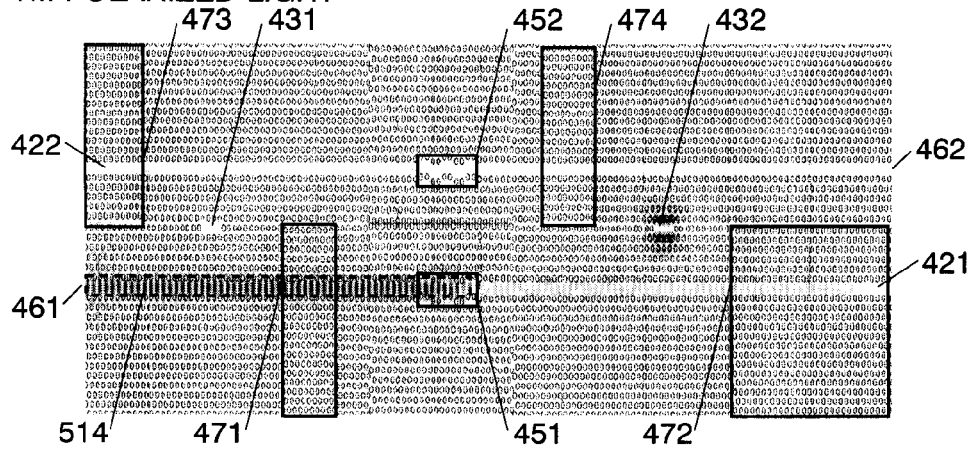

US 7,715,668 B2

POLARIZATION-INDEPENDENT TWO-DIMENSIONAL PHOTONIC CRYSTAL MULTIPLEXER/DEMULTIPLEXER

TECHNICAL FIELD

The present invention relates to a polarization-independent multiplexer/demultiplexer capable of demultiplexing both transverse-electric (TE) and transverse-magnetic (TM) components of light with a predetermined wavelength or multiplexing these two components of light.

BACKGROUND ART

Optical communication is a technique that could play a central role in future broadband communications. Accordingly, for widespread use of the optical communication, the optical components used in optical communication systems are required to be higher in performance, smaller in size and lower in price. Optical communication devices using photonic crystals are one of the leading candidates for the next-generation optical communication components that satisfy the aforementioned requirements. Some of these devices have already been put into practical use, an example of which is a photonic crystal fiber for polarization dispersion compensation. Furthermore, recent efforts have had the practical goal of developing optical multiplexers/demultiplexers and other devices that can be used in wavelength division multiplexing.

A photonic crystal consists of a dielectric body in which a periodic structure is formed. Typically, the periodic structure is created by providing the dielectric body with a periodic arrangement of modified refractive index areas, i.e. the areas whose refractive index differs from that of the dielectric body. Within the crystal, the periodic structure creates a band structure with respect to the energy of light and thereby produces an energy region in which the light cannot be propagated. Such an energy region is called the "photonic band gap" or "PBG."

Providing an appropriate defect in the photonic crystal creates a specific energy level within the PBG ("defect level"), and only such light that has a wavelength (or frequency) corresponding to the defect level is allowed to be present in the vicinity of the defect. A defect that is shaped like a point can be used as a resonator for the light having the aforementioned wavelength, whereas a linearly shaped defect can be used as a waveguide.

As an example of the previously described technique, Patent Document 1 discloses a two-dimensional photonic crystal having a body (or slab) provided with a periodic arrangement of modified refractive index areas, in which a linear defect of the periodic arrangement is created to form a waveguide and a point-like defect is created adjacent to the waveguide to form a resonator. This two-dimensional photonic crystal functions as the following two devices: a demultiplexer for extracting a component of light whose wavelength equals the resonance frequency of the resonator from the components of light having various wavelengths and propagated through the waveguide and for sending the extracted light to the outside; and a multiplexer for introducing the same light from the outside into the waveguide.

Including the one disclosed in Patent Document 1, many two-dimensional photonic crystals are designed so that a wide PBG is created for either a TE-polarized light, in which the electric field oscillates in the direction parallel to the body, or a TM-polarized light, in which the magnetic field oscillates in the direction parallel to the body. In this case, it is possible that no PBG is created for the other polarized light, or a PBG may be created for this polarized light but only under non-optimal conditions.

For example, if the photonic crystal is designed so that a PBG for the TE polarization (TE-PBG) is created and a defect level (resonance wavelength) due to a point-like defect (resonator) is created within the TE-PBG, it is possible that a PBG for the TM polarization (TM-PBG) is not created within the wavelength range of the TE-PBG. In this case, a TM-polarized light having the resonance wavelength does not resonate at the resonator. Therefore, in an attempt to demultiplex light having the resonance wavelength from broadband light passing through a waveguide located in the vicinity of the resonator, though the TE-polarized light can be almost completely extracted, the demultiplexing efficiency will be low since the TM-polarized light cannot be extracted. A similar problem also arises in the case of multiplexing.

Patent Document 1: Japanese Unexamined Patent Application Publication No. 2001-272555 (Paragraphs [0023] through [0027] and [0032]; FIGS. 1 and 5 through 6)

DISCLOSURE OF THE INVENTION

Problem to be Solved by the Invention

The problem to be solved by the present invention is to provide a wavelength multiplexer/demultiplexer capable of multiplexing and demultiplexing light with a specific wavelength for both TE and TM polarizations and thereby achieving a high level of multiplexing/demultiplexing efficiency.

Means for Solving the Problems (1) Configuration of First Mode of Polarization-Independent Two-Dimensional Photonic Crystal Multiplexer/Demultiplexer To solve the aforementioned problem, the polarization-independent two-dimensional photonic crystal multiplexer/demultiplexer according to the first mode of the present invention is a wavelength multiplexer/demultiplexer created on a two-dimensional photonic crystal formed of a plate-shaped body with a periodic distribution of refractive index created therein and having a photonic band gap for the TE polarization, which is characterized by comprising:

a) a first waveguide and a second waveguide separately provided in the two-dimensional photonic crystal, each waveguide formed by creating a linear defect of the periodic distribution of the refractive index;

b) a first resonator and a second resonator separately provided between the first and second waveguides, both resonators having the same resonance wavelength, and each resonator formed by creating a point-like defect of the periodic distribution of the refractive index;

c) a first polarization converter provided on the first waveguide between a first closest point, which is the point closest to the first resonator on the first waveguide, and a second closest point, which is the point closest to the second resonator on the first waveguide, the first polarization converter being capable of converting a TM-polarized light propagated from the first closest point toward the second closest point to a TE-polarized light; and d) a second polarization converter provided on the second waveguide between a third closest point, which is the point closest to the first resonator on the second waveguide, and a fourth point, which is the point closest to the second resonator on the second waveguide, the second polarization converter being capable of converting a TE-polarized light propagated from the third closest point toward the fourth closest point to a TM-polarized light.

The configuration of the polarization-independent two-dimensional photonic crystal multiplexer/demultiplexer according to the first mode of the present invention (which will be referred to as the "first mode multiplexer/demultiplexer") is hereinafter described in detail with reference to the conceptual diagram of FIG. 1.

The first mode multiplexer/demultiplexer is created on a two-dimensional photonic crystal 11. The two-dimensional photonic crystal 11 is a plate-shaped body in which a periodic distribution of the refractive index is created. As explained earlier, there are two types of two-dimensional photonic crystals: One type has a PBG created for the TE polarization, and the other type has a PBG created for the TM polarization. The first mode multiplexer/demultiplexer uses the former type. (The latter type will be used in the second mode, which will be described later.) A PBG for the TM polarization may or may not be created.

In this two-dimensional photonic crystal 11, a first waveguide 121 and second waveguide 122 are separately provided. Each of these waveguides can be formed by creating a linear defect in the periodic diffraction index distribution of the two-dimensional photonic crystal 11.

A first resonator 131 and second resonator 132 are separately provided between the first and second waveguides. Each of these resonators can be formed by creating a point-like defect in the periodic diffraction index distribution of the two-dimensional photonic crystal 11. The resonance wavelength of the resonators can be regulated by changing various parameters as described in Patent Document 1, such as the shape of the point-like defect and the period distance of the refractive index distribution. In the present invention, the first and second resonators 131 and 132 have the same resonance wavelength, which is adjusted at the wavelength of the light that should be multiplexed and/or demultiplexed. In the first mode, since the two-dimensional photonic crystal 11 is designed to have a PBG for the TE polarization, these resonators effectively work only on the TE-polarized light (i.e. multiplex/demultiplex this light with high efficiency).

A first polarization converter 151 is provided on the first waveguide 121 between a first closest point 141, which is the point closest from the first resonator 131 on the first waveguide 121, and a second closest point 142, which is the point closest from the second resonator 132 on the first waveguide 121. This converter is capable of converting a TM-polarized light propagated from the first closest point 141 toward the second closest point 142 to a TE-polarized light. Similarly, a second polarization converter 152 is provided on the second waveguide 122 between a third closest point 143, which is the point closest from the first resonator 131 on the second waveguide 122, and a fourth closest point 144, which is the point closest from the second resonator 132 on the second waveguide 122. This converter is capable of converting a TE-polarized light propagated from the third closest point 143 toward the fourth closest point 144 to a TM-polarized light. It has been already known that such polarization converters for converting a TE-polarized light to a TM-polarized light or vice versa can be created using a two-dimensional photonic crystal (examples of which are disclosed in Sei-ichi Takayama et al, *Preprints of the 52th Spring Meeting of the Japan Society of Applied Physics* 2005, vol. 3, Lecture No. 30a-YV-11, and Yoshinori Tanaka et al, *Preprints of the 66th Autumn Meeting of the Japan Society of Applied Physics* 2005, vol. 3, Lecture No. 8p-H-5). Those two-dimensional photonic crystal polarization converters can be directly used in the present invention.

(1) Operation of First Mode Multiplexer/Demultiplexer

An operation of the first mode multiplexer/demultiplexer is hereinafter described with reference to FIG. 1. The following description initially deals with the use of the device as a demultiplexer for extracting light whose wavelength equals the resonance wavelength (labeled $\lambda r$) of the first and second resonators 131 and 132 from superimposed light containing a large number of wavelength components. In this demultiplexer, the end of the first waveguide 121 closer to the first closest point 141 becomes an input port 161 for the introduction of superimposed light into the first waveguide 121. The end of the second waveguide 122 close to the fourth closest point 144 becomes an output port 162 for the output of demultiplexed light with wavelength $\lambda r$.

When superimposed light is introduced from the input port 161 into the first waveguide 121, a TE-polarized light with wavelength $\lambda r$ contained in the superimposed light resonates with the first resonator 131 and is captured by the same resonator, to be demultiplexed into the second waveguide 122. The demultiplexed TE-polarized light is propagated through the second waveguide 122 toward the output port 162. If this light maintains its original mode (TE polarization) while propagating through the second waveguide, it will be captured by the second resonator 132 and returned to the first waveguide 121. To avoid this situation, the TE-polarized light with wavelength $\lambda r$ that has been demultiplexed into the second waveguide 122 is converted to a TM-polarized light by the second polarization converter 152. The resultant TM-polarized light with wavelength $\lambda r$ passes through the fourth closest point 144 without being captured by the second resonator 132, to be extracted from the output port 162.

Meanwhile, the superimposed light excluding the TE-polarized light with wavelength $\lambda r$ (but including a TM-polarized light with wavelength $\lambda r$) passes through the first closest point 141 without being captured by the first resonator 131 and continues through the first waveguide 121. Then, at the first polarization converter 151, the TM-polarized light with wavelength $\lambda r$ contained in the superimposed light is converted to a TE-polarized light. The resultant TE-polarized light with wavelength $\lambda r$ resonates with the second resonator 132 and is captured by the same resonator, to be demultiplexed into the second waveguide 122.

The components of light that have been introduced from the input port 161 with wavelengths different from $\lambda r$ pass through both of the first and second closest points 141 and 142 on the first waveguide 121; they will not be demultiplexed into the second waveguide 122.

Thus, the first mode multiplexer/demultiplexer can extract both TE and TM polarized lights with wavelength $\lambda r$ from superimposed light introduced from the input port 161 into the first waveguide 121 and demultiplex them into the second waveguide 122.

When the first mode multiplexer/demultiplexer is used as a multiplexer, TE and TM-polarized lights with wavelength $\lambda r$ are introduced from the input port 161 into the first waveguide 121, and the light into which those lights should be multiplexed is introduced into the second waveguide 122 through the end of the second waveguide 122 closer to the third closest point 143. As in the case of the demultiplexer, the TE and TM-polarized lights with wavelength $\lambda r$ that have been introduced into the first waveguide 121 are introduced into the second waveguide 122 through the first and second resonators 131 and 132, respectively, and multiplexed into the light within the second waveguide 122.

The first and second polarization converters may be a polarization converter capable of both TE-to-TM and TM-to-TE conversions. The use of such a polarization converter eliminates the distinction between the first and second waveguides, enabling any one of these waveguides to serve as a waveguide for the introduction of superimposed light and the other to serve as an output waveguide for the demultiplexed light with wavelength λr. This discussion also holds true for the operation as a multiplexer.

(3) Configuration for Improving Efficiency of First Mode Multiplexer/Demultiplexer The TE-polarized light with wavelength λr introduced from the input port 161 is not entirely captured by the first and second resonators 131 and 132 while passing through the first waveguide 121; a portion of this light can pass through the first and closest points 141 and 142. This deteriorates the multiplexing or demultiplexing efficiency. Additionally, a portion of the TE-polarized light with wavelength λr multiplexed or demultiplexed into the second waveguide 122 is propagated in the direction opposite to the output port 162, which also deteriorates the multiplexing or demultiplexing efficiency. To address these problems and improve the multiplexing and demultiplexing efficiencies, the first mode multiplexer/demultiplexer may be configured as follows:

As shown in FIG. 2, a first reflector 171 for reflecting a TE-polarized light with wavelength λr is provided on the first waveguide 121 between the first closest point 141 and the first polarization converter 151. In this configuration, a TE-polarized light with wavelength λr that has passed through without being captured by the first resonator 131 will be reflected by the first reflector 171 toward the first resonator 131 and captured by the same resonator 131, to be introduced into the second waveguide 122. Thus, the multiplexing or demultiplexing efficiency is improved. Similarly, a second reflector 172 may be provided on the first waveguide 121 downstream from the second closest point 142 (i.e. on the side opposite to the input port 161).

Additionally, a third reflector 173 may be provided on the second waveguide 122 within the section upstream from the third closest point 143 (i.e. on the side opposite to the output port 162). In this configuration, a TE-polarized light with wavelength λr being propagated away from the output port 162 will be reflected by the third reflector 173 toward the output port 162. Thus, the multiplexing or demultiplexing efficiency is improved. Similarly, a fourth reflector 174 may be provided on the second waveguide 122 between the fourth closest point 144 and the second polarization converter 152.

To achieve the highest possible multiplexing and demultiplexing efficiencies, it is preferable to provide all of these four reflectors, although the provision of only one, two or three of the four reflectors can certainly improve the efficiency to levels higher than that of the multiplexer/demultiplexer of FIG. 1.

Such a reflector can be created in the following manner: The wavelength range of light that is allowed to transmit through the waveguide changes according to the cycle distance of the refractive index distribution of the two-dimensional photonic crystal. Given this knowledge, the refractive index distribution of the two-dimensional photonic crystal is designed in such a manner that the cycle distance of the refractive index distribution in the reflector differs from that in the sections other than the reflector so that the wavelength λr will not be included in the transmission wavelength band of the waveguide within the reflector. As a result, the TE-polarized light with wavelength λr will be reflected by the boundary between the reflector and the surrounding two-dimensional photonic crystal. A detailed description of this reflector is available in Japanese Unexamined Patent Application Publication No. 2004-233941.

(4) Second Mode of Polarization-Independent Two-Dimensional Photonic Crystal Multiplexer/Demultiplexer The preceding discussion dealt with the first mode multiplexer/demultiplexer using a two-dimensional photonic crystal having a PBG for the TE polarization. It is also possible to use a two-dimensional photonic crystal having a PBG for the TM polarization to create a polarization-independent multiplexer/demultiplexer similar to the first mode. Thus, the polarization-independent two-dimensional photonic crystal multiplexer/demultiplexer according to the second mode of the present invention is a wavelength multiplexer/demultiplexer created on a two-dimensional photonic crystal formed of a plate-shaped body with a periodic distribution of refractive index created therein and having a photonic band gap for the TM polarization, which is characterized by comprising:

a) a first waveguide and a second waveguide separately provided in the two-dimensional photonic crystal, each waveguide formed by creating a linear defect of the periodic distribution of the refractive index;

b) a first resonator and a second resonator separately provided between the first and second waveguides, both resonators having the same resonance wavelength, and each resonator formed by creating a point-like defect of the periodic distribution of the refractive index;

c) a first polarization converter provided on the first waveguide between a first closest point, which is the point closest from the first resonator on the first waveguide, and a second closest point, which is the point closest from the second resonator on the first waveguide, the first polarization converter being capable of converting a TE-polarized light propagated from the first closest point toward the second closest point to a TM-polarized light; and d) a second polarization converter provided on the second waveguide between a third closest point, which is the point closest from the first resonator on the second waveguide, and a fourth point, which is the point closest from the second resonator on the second waveguide, the second polarization converter being capable of converting a TM-polarized light propagated from the third closest point toward the fourth closest point to a TE-polarized light.

In the second mode, since the PBG of the two-dimensional photonic crystal 11 is created for the TM-polarization, both of the first and second resonators effectively operate only for the TM-polarization (i.e. efficiently perform the multiplexing/demultiplexing only for the TM polarization). Therefore, the polarization-independent two-dimensional photonic crystal multiplexer/demultiplexer according to the second mode operates as follows (refer to FIG. 3): When a TM-polarized light with wavelength λr is introduced from the input port 161, the light will be captured by the first resonator 131, to be introduced into the second waveguide 122. Subsequently, this light is converted to a TE-polarized light by the second polarization converter 152 so that it will not be captured by the second resonator 132, and then extracted from the output port 162. When a TE-polarized light with wavelength λr is introduced from the input port 161, the light will be converted to a TM-polarized light by the first polarization converter 151 and then captured by the second resonator 132, to be introduced into the second waveguide 122 and eventually extracted from the output port 162.

As in the first mode, the polarization-independent two-dimensional photonic crystal multiplexer/demultiplexer in the second mode may be provided with one or more reflectors. The reflector in the second mode should reflect TM-polarized light. The location of the reflector is the same as in the first mode.

(5) Polarization-Independent Two-Dimensional Photonic Crystal Multistage Multiplexer/Demultiplexer A polarization-independent two-dimensional photonic crystal multistage multiplexer and demultiplexer capable of multiplexing and demultiplexing at each of different wavelengths are hereinafter described. The polarization-independent two-dimensional photonic crystal multistage demultiplexer (which will be hereinafter called the "multistage demultiplexer") includes a plurality of polarization-independent two-dimensional photonic crystal multiplexers/demultiplexers according to the first or second mode of the present invention (multiplexer/demultiplexer units 10A, 10B, . . . ), which are arranged so that the first waveguides of the multiplexer/demultiplexer units are connected in series. The polarization-independent two-dimensional photonic crystal multistage multiplexer (the "multistage multiplexer") includes a plurality of multiplexer/demultiplexer units 10A, 10B and so on, which are arranged so that the second waveguides of the multiplexer/demultiplexer units are connected in series.

The configuration of the multistage demultiplexer 20 is hereinafter described with reference to FIG. 4. The first waveguide 121 is in the form of a single line connecting the multiplexer/demultiplexer units 10A, 10B and so on. The second waveguides (122A, 122B, . . . ) are separately provided in each of the multiplexer/demultiplexer units 10A, 10B and so on. The first resonators 131A, 131B, . . . of the multiplexer/demultiplexer units 10A, 10B, . . . have resonance wavelengths of $\lambda r_1$, $\lambda r_2$ and so on, which differ from each other. The second resonators 132A, 132B, . . . of the multiplexer/demultiplexer units 10A, 10B, . . . also have resonance wavelengths of $\lambda r_1$, $\lambda r_2$ and so on. Accordingly, the first and second resonators located in the same multiplexer/demultiplexer unit has the same resonance wavelength, and the value of this resonance wavelength of the first and second resonators changes from one multiplexer/demultiplexer unit to another. The configurations and locations of the first polarization converters 151A, 151B, . . . and second polarization converters 152A, 152B, . . . within each multiplexer/demultiplexer unit are identical to those of the already described first or second mode multiplexer/demultiplexer.

An operation of the multistage demultiplexer 20 is hereinafter described. The following description assumes that each of the multiplexer/demultiplexer units 10A and 10B is a first mode multiplexer/demultiplexer. However, the same explanation holds true of the case where each of the multiplexer/demultiplexer units 10A and 10B is a second mode multiplexer/demultiplexer.

Superimposed light containing wavelengths of $\lambda r_1$, $\lambda r_2$ . . . is introduced from the input port 161 of the multiplexer/demultiplexer unit 10A into the first waveguide 121. The TE-polarized light with wavelength $\lambda r_1$ contained in the superimposed light resonates with the first resonator 131A and is captured by the same resonator, to be demultiplexed into the second waveguide 122A. Subsequently, this light is converted to a TM-polarized light so that it will not be captured by the second resonator 132A. The superimposed light excluding the TE-polarized light with wavelength $\lambda r_1$ (but including a TM-polarized light with wavelength $\lambda r_1$) passes by the first resonator 131A.

The TM-polarized light with wavelength $\lambda r_1$ contained in the superimposed light that has passed by the first resonator 131A is converted to a TE-polarized light when it passes through the first polarization converter 151A. The resultant TE-polarized light with wavelength $\lambda r_1$ is captured by the second resonator 132A, to be demultiplexed into the second waveguide 122A. The superimposed light excluding light with wavelength $\lambda r_1$ (but including TE and TM-polarized lights with wavelength $\lambda r_2$) passes by the second resonator 132A. By the operations described to this point, all modes of light with wavelength $\lambda r_1$ originally contained in the superimposed light have been demultiplexed into the second waveguide 122A.

The TE-polarized light with wavelength $\lambda r_2$ contained in the superimposed light that has passed by the second resonator 132A is captured by the first resonator 131B, to be demultiplexed into the second waveguide 122B. Subsequently, this TE-polarized light is converted to a TM-polarized light by the second polarization converter 152B. The superimposed light excluding the light with wavelength $\lambda r_1$ and the TE-polarized light with wavelength $\lambda r_2$ (but including the TM-polarized light with wavelength $\lambda r_2$) passes by the first resonator 131B.

Subsequently, the TM-polarized light with wavelength $\lambda r_2$ contained in the superimposed light is converted to a TE-polarized light when it passes through the first polarization converter 151B. The resultant TE-polarized light with wavelength $\lambda r_2$ is captured by the second resonator 132B, to be demultiplexed into the second waveguide 122B. Thus, all modes of light with wavelength $\lambda r_2$ originally contained in the superimposed light have been demultiplexed into the second waveguide 122B.

In a similar manner, any component of light whose wavelength differs from $\lambda r_1$ and $\lambda r_2$ can be demultiplexed into the second waveguide of the multiplexer/demultiplexer unit by using a multiplexer/demultiplexer unit having the first and second resonators that resonate at the wavelength concerned.

FIG. 5 is a conceptual diagram showing a polarization-independent two-dimensional photonic crystal multistage multiplexer 30 according to the present invention (which will be hereinafter called the "multistage multiplexer 30"). The same elements as used in the previously described multistage demultiplexer 20 are denoted by the same numerals. In the multistage multiplexer 30, the second waveguide 122 is in the form of a single line passing through the multistage multiplexer 30 to connect the multiplexer/demultiplexer units 10A, 10B and so on. The first waveguides 121A, 121B and so on are separately provided in each of the multiplexer/demultiplexer units 10A, 10B and so on. Except for these points, the configuration of the multistage multiplexer 30 is identical to that of the multistage demultiplexer 20. Such common elements are denoted by the same numerals as used for the elements of the multistage demultiplexer 20.

The multistage multiplexer 30 is capable of multiplexing the components of light with wavelengths of $\lambda r_1$, $\lambda r_2$, . . . from the first waveguides 121A, 121B, . . . into the second waveguide 122 at the multiplexer/demultiplexer units 10A, 10B, . . . , respectively. The operations of the resonators and polarization converters in each multiplexer/demultiplexer unit during the multiplexing process are the same as those of the first or second mode multiplexer/demultiplexer.

In the multistage demultiplexer 20 or multistage demultiplexer 30, the first and second polarization converters used in each of the multiplexer/demultiplexer units 10A and 10B may be a polarization converter capable of both TE-to-TM and TM-to-TE conversions. In this case, the configuration of the multistage demultiplexer 20 is the same as that of the multistage multiplexer 30. Use of such a polarization converter makes it possible to create a polarization-independent two-dimensional photonic crystal multistage multiplexer/demultiplexer capable of both multiplexing and demultiplexing the components of light with different wavelengths $\lambda r_1$, $\lambda r_2$ and so on.

EFFECT OF THE INVENTION

The polarization-independent two-dimensional photonic crystal multiplexer/demultiplexer according to the present invention makes it possible to multiplex and demultiplex both TE and TM-polarized lights with a predetermined wavelength, whereby the multiplexing and demultiplexing efficiencies can be enhanced to a level higher than those of many conventional types of two-dimensional photonic crystal multiplexer/demultiplexer that can only multiplex and demultiplex either a TE or TM-polarized light.

BRIEF DESCRIPTION OF THE DRAWINGS

FIG. 6 is a top view showing an embodiment of a polarization-independent two-dimensional photonic crystal multiplexer/demultiplexer according to the present invention.

FIG. 7 is a top view showing the configuration of a first polarization converter 451 and a second polarization converter 452, and vertical sectional views at sections A-A' and B-B' shown in the top view.

FIG. 8 is a top view showing the configuration of a multiplexer/demultiplexer 50 which is an embodiment of the polarization-independent two-dimensional photonic crystal multiplexer/demultiplexer provided with reflectors.

FIG. 9 shows a calculated result of the intensity distribution of TE and TM-polarized lights within a waveguide in the case of introducing a TE-polarized light into the input port 461 of the multiplexer/demultiplexer 50.

FIG. 10 is shows a calculated result of the intensity distribution of TE and TM-polarized lights within a waveguide in the case of introducing a TM-polarized light into the input port 461 of the multiplexer/demultiplexer 50.

Figure 1:
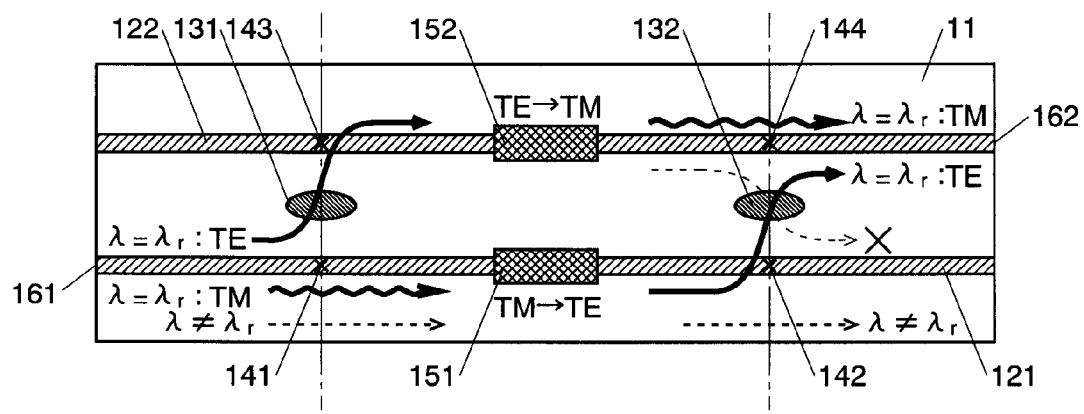
FIG. 1 is a conceptual diagram of a first mode polarization-independent two-dimensional photonic crystal multiplexer/demultiplexer according to the present invention.
Figure 2:
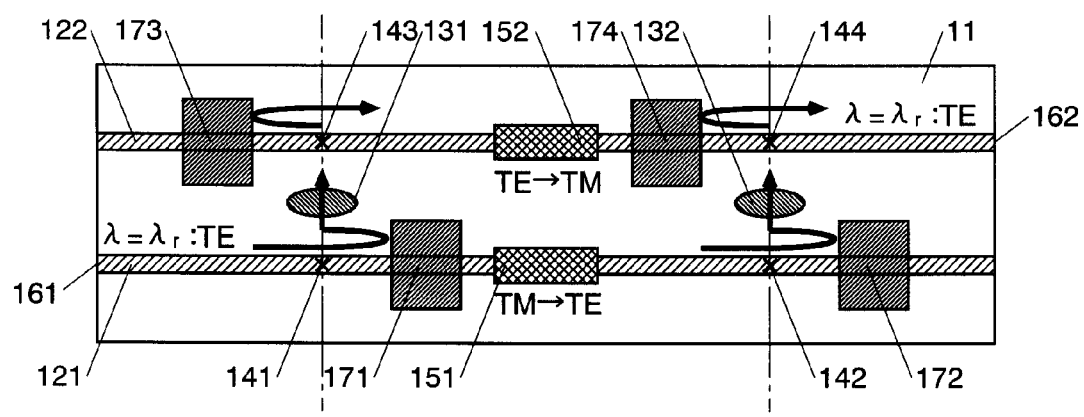
FIG. 2 is a conceptual diagram of the first mode polarization-independent two-dimensional photonic crystal multiplexer/demultiplexer having reflectors 171 to 174.
Figure 3:
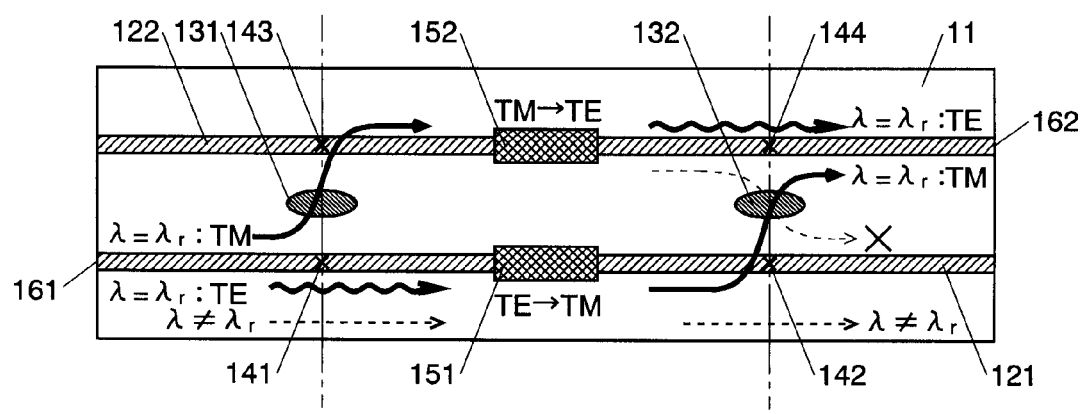
FIG. 3 is a conceptual diagram of a second mode polarization-independent two-dimensional photonic crystal multiplexer/demultiplexer according to the present invention.
Figure 4:
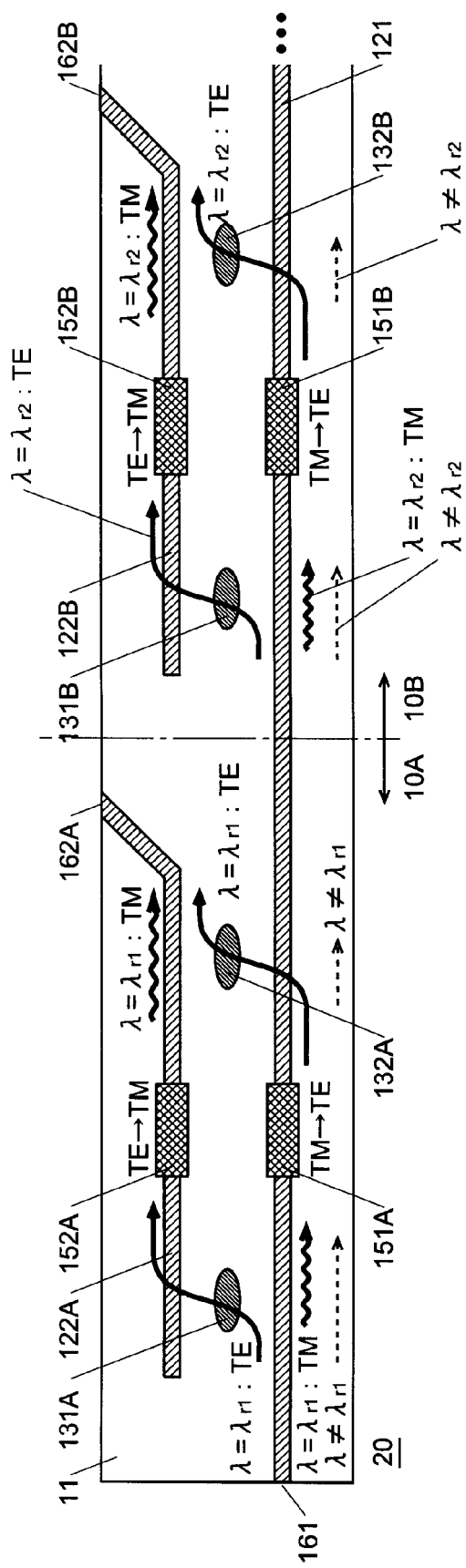
FIG. 4 is a conceptual diagram of a polarization-independent two-dimensional photonic crystal multistage multiplexer/demultiplexer according to the present invention.
Figure 5:
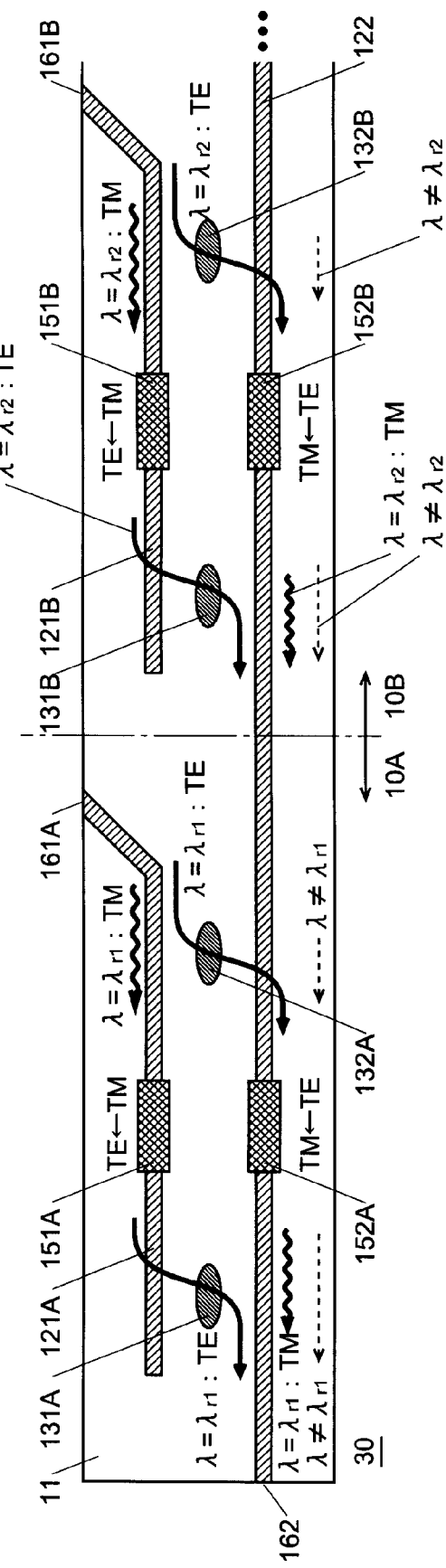
FIG. 5 is a conceptual diagram of a polarization-independent two-dimensional photonic crystal multistage multiplexer/demultiplexer according to the present invention.

EXPLANATION OF NUMERALS 10A, 10B, 40A, 40B . . . Multiplexer/Demultiplexer Unit
11, 41 . . . Two-Dimensional Photonic Crystal
121, 121A, 121B, 421, 62 . . . First Waveguide
122, 122A, 122B, 422, 422A, 422B . . . Second Waveguide
131, 131A, 131B, 431, 431A, 431B . . . First Resonator
132, 132A, 132B, 432, 432A, 432B . . . Second Resonator
141 . . . First Closest Point
142 . . . Second Closest Point
143 . . . Third Closest Point
144 . . . Fourth Closest Point
151, 151A, 151B, 451, 451A, 451B . . . First Polarization Converter
152, 152A, 152B, 452, 452A, 452B . . . Second Polarization Converter
161, 461 . . . Input Port
162, 462 . . . Output Port
171, 471 . . . First Reflector
172, 472 . . . Second Reflector
173, 473 . . . Third Reflector
174, 474 . . . Fourth Reflector
20 . . . Polarization-Independent Two-Dimensional Photonic Crystal Multistage Demultiplexer (Multistage Demultiplexer)
30 . . . Polarization-Independent Two-Dimensional Photonic Crystal Multistage Multiplexer (Multistage Multiplexer)
40, 50 . . . Multiplexer/Demultiplexer
411 . . . Slab
412 . . . Air Hole
412A, 412B . . . Oblique Air Hole
48 . . . Section Including Polarization Converters
511, 512, 515, 516 . . . Area Where TE-Polarized Light Is Present
513, 514 . . . Area Where TM-Polarized Light Is Present
60 . . . Multistage Multiplexer/Demultiplexer
62A, 62B . . . Bending Portion

BEST MODES FOR CARRYING OUT THE INVENTION (1) First Embodiment of Polarization-Independent Two-Dimensional Photonic Crystal Multiplexer/Demultiplexer According to Present Invention The first embodiment of the polarization-independent two-dimensional photonic crystal multiplexer/demultiplexer according to the present invention is hereinafter described with reference to FIGS. 6 and 7. FIG. 6 is a top view of the multiplexer/demultiplexer 40 in the present embodiment. The two-dimensional photonic crystal 41 used in this multiplexer/demultiplexer is similar to the one shown in Patent Document 1; it is made of a slab 411 in which a periodic distribution of refractive index is created by arranging circular air holes (modified refractive index areas) 412 in a triangular lattice pattern. This two-dimensional photonic crystal 41 has a PBG created for the TE polarization.

A first waveguide 421 is formed by omitting one row of air holes 412 (i.e. by not providing air holes 412 along one line of the triangular lattice). Similarly, a second waveguide 422 is formed separately from the first waveguide 421. A first resonator 431 is created between the first and second waveguides 421 and 422 by omitting three air holes 412 aligned parallel to the first and second waveguides 421 and 422. Similarly, a second resonator 432 is created separately from the first resonator 431 between the first and second waveguides 421 and 422.

A first polarization converter 451 is provided between the point closest from the first resonator 431 on the first waveguide 421 and the point closest from the second resonator 432. Similarly, a second polarization converter 452 is provided between the point closest from the first resonator 431 on the second waveguide 422 and the point closest from the second resonator 432. As shown in FIG. 7, among the air holes located on both sides of the first waveguide 421 in the first polarization converter 451, the two pairs of air holes located on the side closer to the first resonator 431 extend perpendicularly to the first waveguide 421 and obliquely at an angle of 45° to the plane of the slab 411. (These pairs are hereinafter called the "oblique air holes 412A.") The other two pairs of air holes on both sides of the first waveguide 421, which are located closer to the second resonator 432 and next to the oblique air holes 412A, are shaped like a mirror image of the oblique air holes 412A with respect to a plane of mirror symmetry parallel to the extending direction of the first waveguide 421. (These pairs are hereinafter called the "oblique air holes 412B.") Additionally, another set of oblique air holes having the same configuration as those of the oblique air holes 412A and 412B is provided on the side closer to the second resonator 432 from the air holes 412A and 412B. The second polarization converter 452 is identical in configuration to the first polarization converter 451.

The oblique air holes can be created by an anisotropic etching process. An example of the anisotropic etching process is a plasma-etching method using an electric field by which a plasma gas is made to move in a specific direction and collide with the slab 411; another example is a method using a focused ion beam.

These first and second polarization converters 451 and 452 are each capable of both TE-to-TM and TM-to-TE conversions, regardless of the direction of the light propagating through the waveguide within the polarization converter. That is, a TE-polarized light propagated from the first resonator 431 toward the second resonator 432 is converted to a TM-polarized light, and a TM-polarized light to a TE-polarized light. Similarly, a TE-polarized light propagated from the second resonator 432 toward the first resonator 431 is converted to a TM-polarized light, and a TM-polarized light to a TE-polarized light.

However, the first and second polarization converters 451 and 452 have a limited frequency range within which they can convert the polarization. The range is between 0.270c/a to 0.274c/a, where a is the cycle distance of the triangular lattice and c is the speed of light. By contrast, the resonance frequency of the first resonator 431 and the second resonator is 0.261c/a. Accordingly, if the cycle distance of the triangular lattice is uniform over the entire two-dimensional photonic crystal 41, it is impossible to convert the polarization because the light whose frequency equals the resonance frequency of the resonators (i.e. the frequency of the light to be multiplexed or demultiplexed) is not included within the conversion-capable frequency band of the polarization converters. Given this problem, in the present embodiment, the cycle distance of the triangular lattice is varied: the value is $a_0$ within the regions except for the section 48 including the first and second polarization converters 451 and 452, and $1.041a_0$ within this section 48. This configuration gives the polarization converter a conversion-capable frequency band of $0.259c/a_0$ to $0.263c/a_0$, which includes the frequency of the light to be multiplexed or demultiplexed: $0.261c/a_0$.

The operation of the multiplexer/demultiplexer 40 in the present embodiment as a demultiplexer is as follows: When superimposed light containing a wavelength that equals the resonance wavelength λr (or resonance frequency) of the first resonator 431 and the second resonator is introduced into the first waveguide 421 from the end of the same waveguide 421 closer to the first resonator 431 (i.e. from the input port 461), the TE-polarized light with wavelength λr contained in the superimposed light resonates with the first resonator 431 and is captured by the same resonator, to be demultiplexed into the second waveguide 422. The demultiplexed TE-polarized light is converted to a TM-polarized light by the second polarization converter 452 and extracted from the end of the second waveguide 422 closer to the second resonator 432 (i.e. from the output port 462) without being captured by the same resonator 432. The superimposed light excluding the TE-polarized light with wavelength λr (but including a TM-polarized light with wavelength λr) passes through without being captured by the first resonator 431. Among this superimposed light, the TM-polarized light with wavelength λr is converted to a TE-polarized light by the first polarization converter 451. The resultant TE-polarized light resonates with the second resonator 432 and is captured by the same resonator, to be demultiplexed into the second waveguide 422.

The operation of the multiplexer/demultiplexer 40 as a multiplexer is as follows: When superimposed light is introduced into the second waveguide and TE and TM-polarized lights with wavelength λr are introduced into the first waveguide 421, the TE-polarized light with wavelength λr is captured by the first resonator 431, to be multiplexed into the second waveguide 422. Subsequently, this TE-polarized light with wavelength λr is converted to a TM-polarized light by the second polarization converter 452 and so will not be captured by the second resonator 432. This TM-polarized light with wavelength λr will not be captured by the first resonator 431 but converted to a TE-polarized light by the first polarization converter 451. The resultant TE-polarized light with wavelength λr is captured by the second resonator 432, to be multiplexed into the second waveguide 422.

In the two-dimensional photonic crystal 41, it is possible to use equilateral-triangular air holes in place of the circular air holes 412 to obtain a two-dimensional photonic crystal having a PBG created for the TM polarization. Providing this two-dimensional photonic crystal with waveguides, resonators and polarization converters as in the multiplexer/demultiplexer 40 results in a second mode polarization-independent two-dimensional photonic crystal multiplexer/demultiplexer.

(2) Embodiment of Polarization-Independent Two-Dimensional Photonic Crystal Multiplexer/Demultiplexer with Reflectors With reference to FIG. 8, one embodiment of the polarization-independent two-dimensional photonic crystal multiplexer/demultiplexer with reflectors is hereinafter described. This multiplexer/demultiplexer 50 has an area 471 within which air holes 412 are arrayed with a cycle distance of $0.965a_0$, which is shorter than that in the surrounding area, between the point closest from the first resonator 431 on the first waveguide 421 and the first polarization converter 451 of the previously described multiplexer/demultiplexer 40. Arraying the air holes 412 with such a cycle distance causes the transmission wavelength band in the area 471 (i.e. the wavelength band within which a TE-polarized light can pass through the first waveguide 421) to be shifted toward the shorter-wavelength side from the wavelength band of the other area of the first waveguide 421 so that the wavelength λr is excluded from the transmission wavelength band. Therefore, the area 471 functions as a first reflector 471 for reflecting the TE-polarized light with wavelength λr propagated through the first waveguide 421.

Also provided in a similar manner are a second reflector 472 between the point closest from the second resonator 432 on the first waveguide 421 and the end of the first waveguide, a third reflector 473 between the point closest from the first resonator 431 on the second waveguide 422 and the end of the second waveguide, and a fourth reflector 474 between the point closest from the second resonator 432 on the second waveguide 422 and the second polarization converter 452.

In the multiplexer/demultiplexer 50, a TE-polarized light with wavelength λr that has passed without being captured by the first resonator 431 is reflected by the first reflector 471 toward the first resonator 431 and captured by the same resonator 431, to be introduced into the second waveguide 422, whereby the multiplexing or demultiplexing efficiency is improved. The second reflector 472 also operates in a similar manner.

Among the TE-polarized light with wavelength λr introduced from the first resonator 431 into the second waveguide 422, the portion propagating toward the output port 462 is reflected by the third resonator 473 toward the output port 462, whereby the multiplexing or demultiplexing efficiency is improved. The fourth reflector 474 also operates in a similar manner.

FIG. 9 shows the distribution of TE and TM-polarized lights with wavelength λr in the case of introducing a TE-polarized light with wavelength λr from the input port 461 of the multiplexer/demultiplexer 50, calculated by a three-dimensional FDTD (finite difference time domain) method. Similarly, FIG. 10 shows a similarly calculated distribution of TE and TM-polarized lights with wavelength λr within the multiplexer/demultiplexer 50 in the case of introducing a TM-polarized light with wavelength λr from the input port 461. In these figures, the areas surrounded by the dashed lines on the waveguide indicate the areas where light is present. The magnitude of the amplitude of the light is indicated by the density of the stripe patterns in the figure.

In the case of introducing a TE-polarized light with wavelength λr into the input port 461, the TE-polarized light is present in the area 511 located upstream from the first reflector 471 on the first waveguide 421 and the area 512 between the third reflector 473 and the second polarization converter 452 on the second waveguide 422 (FIG. 9(a)). This demonstrates that the TE-polarized light with wavelength λr supplied from the input port 461 is introduced from the first waveguide 421 into the second waveguide 422, and reflected by the first reflector 471 and the third reflector 473. Since this TE-polarized light is converted to a TM-polarized light by the second polarization converter 452, a TM-polarized light is present within the area 513 downstream from the second polarization converter 452 on the second waveguide 422 (FIG. 9(b)); no TE-polarized light exists in this area. Neither TE nor TM polarized light is observed in the area downstream from the first polarization converter 451.

In the case of introducing a TM-polarized light with wavelength λr into the input port 461, the TM-polarized light is present only in the area 514 located upstream from the first converter 451 on the first waveguide 421. On the other hand, the TE-polarized light is present in the area 515 between the first polarization converter 451 and the second reflector 472 on the first waveguide 421 and the area 516 located downstream from the fourth reflector 474 on the second waveguide 422. This demonstrates that the TM-polarized light with wavelength λr is converted to a TE-polarized light by the first polarization converter 451, the TE-polarized light resulting from the polarization conversion is introduced into the second waveguide 422, and the TE-polarized light resulting from the polarization conversion is reflected by the second reflector 472 and the fourth reflector 474.

Figure 11:
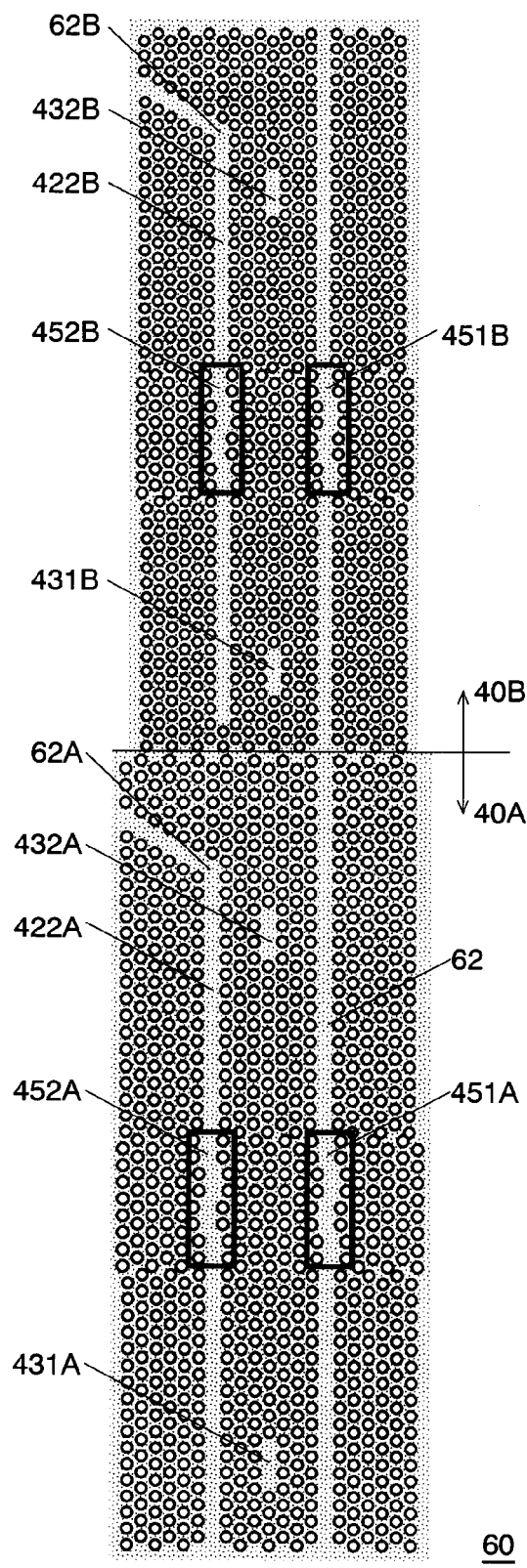
FIG. 11 is a top view showing an embodiment of the polarization-independent two-dimensional photonic crystal multistage multiplexer/demultiplexer according to the present invention.

(3) Embodiment of Polarization-Independent Two-Dimensional Photonic Crystal Multistage Multiplexer/Demultiplexer One embodiment of the polarization-independent two-dimensional photonic crystal multistage multiplexer/demultiplexer according to the present invention is hereinafter described with reference to FIG. 11. The multistage multiplexer/demultiplexer 60 in the present embodiment consists of a multiplexer/demultiplexer unit 40A connected to another multiplexer/demultiplexer unit 40B. The multiplexer/demultiplexer unit 40A is structurally identical to the previously described multiplexer/demultiplexer 40 except for the second waveguide 422. The multiplexer/demultiplexer unit 40B is a reduced version of the multiplexer/demultiplexer unit 40A. That is, the two multiplexer/demultiplexer units 40A and 40B are similar. In this case, the wavelength $\lambda r_1$ at which the first and second resonators 431A and 432A of the multiplexer/demultiplexer unit 40A resonate with the TE-polarized light differs from the wavelength $\lambda r_2$ at which the first and second resonators 431B and 432B of the multiplexer/demultiplexer unit 40B resonate with the TE-polarized light.

The first waveguide of the multiplexer/demultiplexer unit 40A is connected to that of the multiplexer/demultiplexer unit 40B to form a single waveguide 62. On the other hand, the second waveguide 422A of the multiplexer/demultiplexer unit 40A and the second waveguide 422B of the multiplexer/demultiplexer unit 40B are separately provided and not connected to each other. The second waveguides 422A and 422B have bending portions 62A and 62B, respectively. Within the sections downstream from these bending portions, the second waveguides 422A and 422B become more distant from the first waveguide 62 as they extend downstream.

The operation of the multistage multiplexer/demultiplexer 60 as a demultiplexer is as follows: When superimposed light containing TE and TM polarized lights with wavelength $\lambda r_1$ and TE and TM polarized lights with wavelength $\lambda r_2$ is introduced from the end of the first waveguide 62 closer to the multiplexer/demultiplexer unit 40A, the TE-polarized light with wavelength $\lambda r_1$ is captured by the first resonator 431A of the multiplexer/demultiplexer unit 40A, to be demultiplexed into the second waveguide 422A. Subsequently, this TE-polarized light is converted to a TM-polarized light by the second polarization converter 452A of the multiplexer/demultiplexer unit 40A.

The superimposed light excluding the TE-polarized light with wavelength $\lambda r_1$ (but including the TM polarized light with wavelength $\lambda r_1$ and the TE and TM polarized lights with wavelength $\lambda r_2$) passes through without being captured by the first resonator 431A. Among this superimposed light, the TM-polarized light with wavelength $\lambda r_1$ is converted to a TE-polarized light by the first polarization converter 451A of the multiplexer/demultiplexer unit 40A. The resultant TE-polarized light with wavelength $\lambda r_1$ is captured by the second resonator 432A of the multiplexer/demultiplexer unit 40A, to be demultiplexed into the second waveguide 422A.

The superimposed light containing the TE and TM polarized lights with wavelength $\lambda r_2$ passes through without being captured by the second resonator 432A. Among this superimposed light, the TE-polarized light with wavelength $\lambda r_2$ is captured by the first resonator 431B of the multiplexer/demultiplexer unit 40B, to be demultiplexed into the second waveguide 422B. Subsequently, this TE-polarized light is converted to a TM-polarized light by the second polarization converter 452B of the multiplexer/demultiplexer unit 40B.

The superimposed light containing the TM polarized light with wavelength $\lambda r_2$ passes through without being captured by the second resonator 431B. Among this superimposed light, the TM-polarized light with wavelength $\lambda r_2$ is converted to a TE-polarized light by the first polarization converter 451B of the multiplexer/demultiplexer unit 40B. The resultant TE-polarized light with wavelength $\lambda r_2$ is captured by the second resonator 432B of the multiplexer/demultiplexer unit 40B, to be demultiplexed into the second waveguide 422B.

Among the superimposed light, the components whose wavelengths differ from $\lambda r_1$ and $\lambda r_2$ are allowed to pass through the first waveguide 62.

As already stated, the polarization converters used in the multistage multiplexer/demultiplexer 60 in the present embodiment are capable of both TE-to-TM and TM-to-TE conversions, regardless of the direction of propagation. Therefore, the operation of the multistage multiplexer/demultiplexer 60 as a multiplexer is the same as that of the demultiplexer when the flow of light is reversed for any wavelength and polarization.

The invention claimed is:

1. A polarization-independent two-dimensional photonic crystal multiplexer/demultiplexer created on a two-dimensional photonic crystal formed of a plate-shaped body with a periodic distribution of refractive index created therein and having a photonic band gap for TE polarization, comprising:
   a) a first waveguide and a second waveguide separately provided in the two-dimensional photonic crystal, each waveguide formed by creating a linear defect of the periodic distribution of the refractive index;
   b) a first resonator and a second resonator separately provided between the first and second waveguides, both resonators having a same resonance wavelength, and each resonator formed by creating a point-like defect of the periodic distribution of the refractive index;
   c) a first polarization converter provided on the first waveguide between a first closest point, which is a point closest from the first resonator on the first waveguide, and a second closest point, which is a point closest from the second resonator on the first waveguide, the first polarization converter being capable of converting a TM-polarized light propagated from the first closest point toward the second closest point to a TE-polarized light; and
   d) a second polarization converter provided on the second waveguide between a third closest point, which is a point closest from the first resonator on the second waveguide, and a fourth closest point, which is a point closest from the second resonator on the second waveguide, the second polarization converter being capable of converting a TE-polarized light propagated from the third closest point toward the fourth closest point to a TM-polarized light.

2. The polarization-independent two-dimensional photonic crystal multiplexer/demultiplexer according to claim 1, wherein a reflector for reflecting the TE-polarized light whose wavelength equals the resonance frequency of the first and second resonators is provided at one or more of following locations: on the first waveguide between the first closest point and the first polarization converter; on the first waveguide between the second closest point and an end of the first waveguide; on the second waveguide between the third closest point and an end of the second waveguide; and on the second waveguide between the fourth closest point and the second polarization converter.

3. The polarization-independent two-dimensional photonic crystal multiplexer/demultiplexer according to claim 2, wherein regions where the cycle distance is altered from that of the two-dimensional photonic crystal to creates the reflector so that the wavelength which equals the resonance wavelength is excluded from a transmission wavelength band of the waveguide within the reflector.

4. The polarization-independent two-dimensional photonic crystal multiplexer/demultiplexer according to claim 1, wherein the first polarization converter and/or the second polarization converter is created by giving the first waveguide and/or the second waveguide an asymmetrical shape in a direction parallel to the body and perpendicular to the waveguide and in a direction perpendicular to the body.

5. The polarization-independent two-dimensional photonic crystal multiplexer/demultiplexer according to claim 4, wherein the asymmetry of the cross sectional shape is created by presence of an oblique column formed on a side portion of the waveguide, the oblique column having a refractive index different from that of the body and extending obliquely with respect to a plane of the body.

6. The polarization-independent two-dimensional photonic crystal multiplexer/demultiplexer according to claim 1, wherein the first and second polarization converters are capable of both TE-to-TM and TM-to-TE conversions.

7. A polarization-independent two-dimensional photonic crystal demultiplexer, comprising a plurality of polarization-independent two-dimensional photonic crystal multiplexers/demultiplexers according to claim 1, wherein:
   the first waveguides of the plurality of polarization-independent two-dimensional photonic crystal multiplexers/demultiplexers are connected to form a single waveguide; and
   a value of the resonance wavelength of the first and second resonators changes from one polarization-independent two-dimensional photonic crystal multiplexer/demultiplexer to another.

8. A polarization-independent two-dimensional photonic crystal demultiplexer according to claim 7 wherein the first and second polarization converters of the polarization-independent two-dimensional photonic crystal multiplexers/demultiplexers are capable of both TE-to-TM and TM-to-TE conversions.

9. A polarization-independent two-dimensional photonic crystal multiplexer, comprising a plurality of polarization-independent two-dimensional photonic crystal multiplexers/demultiplexers according to claim 1, wherein:
   the second waveguides of the plurality of polarization-independent two-dimensional photonic crystal multiplexers/demultiplexers are connected to form a single waveguide; and
   a value of the resonance wavelength of the first and second resonators changes from one polarization-independent two-dimensional photonic crystal multiplexer/demultiplexer to another.

10. The polarization-independent two-dimensional photonic crystal multiplexer according to claim 9, wherein the first and second polarization converters of each of the polarization-independent two-dimensional photonic crystal multiplexers/demultiplexers are capable of both TE-to-TM and TM-to-TE conversions.

11. A polarization-independent two-dimensional photonic crystal multiplexer/demultiplexer created on a two-dimensional photonic crystal formed of a plate-shaped body with a periodic distribution of refractive index created therein and having a photonic band gap for TM polarization, comprising:
   a) a first waveguide and a second waveguide separately provided in the two-dimensional photonic crystal, each waveguide formed by creating a linear defect of the periodic distribution of the refractive index;
   b) a first resonator and a second resonator separately provided between the first and second waveguides, both resonators having a same resonance wavelength, and each resonator formed by creating a point-like defect of the periodic distribution of the refractive index;
   c) a first polarization converter provided on the first waveguide between a first closest point, which is a point closest from the first resonator on the first waveguide, and a second closest point, which is a point closest from the second resonator on the first waveguide, the first polarization converter being capable of converting a TE-polarized light propagated from the first closest point toward the second closest point to a TM-polarized light; and d) a second polarization converter provided on the second waveguide between a third closest point, which is a point closest from the first resonator on the second waveguide, and a fourth closest point, which is a point closest from the second resonator on the second waveguide, the second polarization converter being capable of converting a TM-polarized light propagated from the third closest point toward the fourth closest point to a TE-polarized light.

12. The polarization-independent two-dimensional photonic crystal multiplexer/demultiplexer according to claim 11, wherein a reflector for reflecting the TM-polarized light whose wavelength equals the resonance frequency of the first and second resonators is provided at one or more of following locations: on the first waveguide between the first closest point and the first polarization converter; on the first waveguide between the second closest point and an end of the first waveguide; on the second waveguide between the third closest point and an end of the second waveguide; and on the second waveguide between the fourth closest point and the second polarization converter.

13. The polarization-independent two-dimensional photonic crystal multiplexer/demultiplexer according to claim 12, wherein regions where the cycle distance is altered from that of the two-dimensional photonic crystal to creates the reflector so that the wavelength which equals the resonance wavelength is excluded from a transmission wavelength band of the waveguide within the reflector.

14. The polarization-independent two-dimensional photonic crystal multiplexer/demultiplexer according to claim 11, wherein the first polarization converter and/or the second polarization converter is created by giving the first waveguide and/or the second waveguide an asymmetrical shape in a direction parallel to the body and perpendicular to the waveguide and in a direction perpendicular to the body.

15. The polarization-independent two-dimensional photonic crystal multiplexer/demultiplexer according to claim 14, wherein the asymmetry of the cross sectional shape is created by presence of an oblique column formed on a side portion of the waveguide, the oblique column having a refractive index different from that of the body and extending obliquely with respect to a plane of the body.

16. The polarization-independent two-dimensional photonic crystal multiplexer/demultiplexer according to claim 11, wherein the first and second polarization converters are capable of both TE-to-TM and TM-to-TE conversions.

17. A polarization-independent two-dimensional photonic crystal demultiplexer, comprising a plurality of polarization-independent two-dimensional photonic crystal multiplexers/demultiplexers according to claim 11, wherein:
the first waveguides of the plurality of polarization-independent two-dimensional photonic crystal multiplexers/demultiplexers are connected to form a single waveguide; and
a value of the resonance wavelength of the first and second resonators changes from one polarization-independent two-dimensional photonic crystal multiplexer/demultiplexer to another.

18. The polarization-independent two-dimensional photonic crystal demultiplexer according to claim 17, wherein the first and second polarization converters of each of the polarization-independent two-dimensional photonic crystal multiplexers/demultiplexers are capable of both TE-to-TM and TM-to-TE conversions.

19. A polarization-independent two-dimensional photonic crystal multiplexer, comprising a plurality of polarization-independent two-dimensional photonic crystal multiplexers/demultiplexers according to claim 11, wherein:
the second waveguides of the plurality of polarization-independent two- dimensional photonic crystal multiplexers/demultiplexers are connected to form a single waveguide; and
a value of the resonance wavelength of the first and second resonators changes from one polarization-independent two-dimensional photonic crystal multiplexer/demultiplexer to another.

20. The polarization-independent two-dimensional photonic crystal multiplexer according to claim 19, wherein the first and second polarization converters of each of the polarization-independent two-dimensional photonic crystal multiplexers/demultiplexers are capable of both TE-to-TM and TM-to-TE conversions.

* * * * *